(12) United States Patent
French

(10) Patent No.: US 7,882,164 B1
(45) Date of Patent: Feb. 1, 2011

(54) IMAGE CONVOLUTION ENGINE OPTIMIZED FOR USE IN PROGRAMMABLE GATE ARRAYS

(75) Inventor: Matthew C. French, Falls Church, VA (US)

(73) Assignee: University of Southern California, Los Angeles, CA (US)

( * ) Notice: Subject to any disclaimer, the term of this patent is extended or adjusted under 35 U.S.C. 154(b) by 1321 days.

(21) Appl. No.: 11/233,938

(22) Filed: Sep. 22, 2005

Related U.S. Application Data

(60) Provisional application No. 60/612,738, filed on Sep. 24, 2004.

(51) Int. Cl.
G06F 17/10 (2006.01)
G06F 17/17 (2006.01)
(52) U.S. Cl. .................................. 708/319; 708/313
(58) Field of Classification Search .......... 708/300–319
See application file for complete search history.

(56) References Cited

U.S. PATENT DOCUMENTS

| | | | | |
|---|---|---|---|---|
| 4,344,149 A * | 8/1982 | van de Meeberg et al. | .. | 708/313 |
| 4,843,581 A * | 6/1989 | Cupo et al. | .................. | 708/300 |
| 5,206,821 A * | 4/1993 | Young et al. | ................. | 708/313 |
| 5,258,939 A * | 11/1993 | Johnstone et al. | ........... | 708/313 |
| 6,668,013 B1 * | 12/2003 | Okuno | ........................ | 375/229 |
| 6,701,024 B1 * | 3/2004 | Sasai | .......................... | 382/260 |
| 2002/0106136 A1 * | 8/2002 | Oka et al. | .................... | 382/307 |

OTHER PUBLICATIONS

French, M., "A Power Efficient Image Covolution Engine for Field Programmable Gate Arrays," in 7th Annual International Conference on Military and Aerospace Programmable Logic Devices (MAPLD '04), Washington, DC, USA, Sep. 2004 ( 2 pages).

French, M. et al., "Design Tools for Reconfigurable Hardware in Orbit (RHinO)", Earth Science Technology Conference, Jun. 2004, Palo Alto, California (6 pages).

* cited by examiner

*Primary Examiner*—Tan V Mai
(74) *Attorney, Agent, or Firm*—Fish & Richardson P.C.

(57) ABSTRACT

Minimizing the power consumption in a field programmable gate array (FPGA) when used for convolution. The power consuming parts of the calculation are determined, and symmetry in those parts is exploited. For example, when multiplying by a filter have in common Values, the symmetry in the taps is detected. The values to be multiplied by the common tap values are edited and then the added value is multiplied. This minimizes the number of multipliers, thereby reducing power consumption.

4 Claims, 5 Drawing Sheets

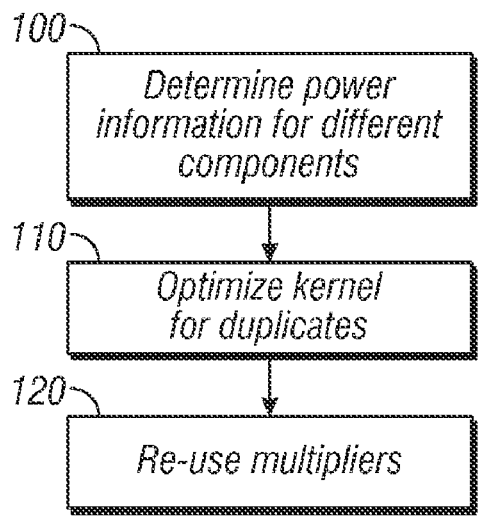

IMAGE CONVOLUTION ENGINE OPTIMIZED FOR USE IN PROGRAMMABLE GATE ARRAYS

CLAIM OF PRIORITY

This application claims priority under 35 USC §119(e) to U.S. Patent Application Ser. No. 60/612,738, filed on Sep. 24, 2004, the entire contents of which are hereby incorporated by reference.

FEDERALLY SPONSORED RESEARCH OR DEVELOPMENT

The U.S. Government may have certain rights in this invention pursuant to Grant No. EEC09529152NSF.

BACKGROUND

Programmable gate arrays may be used for many hardware tasks. A field programmable gate array—or FPGA—has become recently popular, and may be used for the front end input to digital signal processing (DSP) applications. The FPGA device may directly impact the performance of the DSP. For example, dedicated multipliers may be used to increase and improve the DSP performance. Better and more precise multipliers may be used for sophisticated DSP kernels such as finite impulse response filters, e.g., filters with hundreds of taps.

Increases in electronic performance have provided more DSP processing power for each new generation of FPGA. However, there is a trade-off of power consumption. The trends have resulted in exponentially-increasing maximum power per device for new generations of FPGAs. This has led to power being considered as an important design parameter in the FPGA. Power consumption may be especially critical for power critical applications including space-based applications, handheld device, and remotely-positioned sensors. Power consumption is not reflected in conventional FPGA tools.

SUMMARY

The present application describes an FPGA design, which includes the ability to design power savings into the resulting FPGA. An embodiment describes an image convolution kernel which is specifically designed for power savings. Aspects include combining the design with an FPGA microarchitecture, in order to optimize total switching capacitance and throughput.

An aspect handles routing by eliminating monolithic global state machines in favor of a distributed control flow. Different aspects are describing for choosing the placement for the wires in order to minimize capacitance.

BRIEF DESCRIPTION OF THE DRAWINGS

These and other aspects will now be described in detail with reference to the accompanying drawings, wherein:

FIG. 1 shows a flowchart of operation for reducing power consumption;

FIG. 2a-2e shows different filter kernels;

DETAILED DESCRIPTION

The general structure and techniques, and more specific embodiments which can be used to effect different ways of carrying out the more general goals are described herein.

An embodiment is described herein in terms of a 3×3 image convolution kernel which provides up to an 8.9 times increase in power efficiency over other techniques. It should be understood, however, that the techniques disclosed herein may be used to form any size image convolution kernel, as well as from other applications.

FIG. 1 shows a flowchart of the operations which are carried out for the power detection. This flowchart shows acts that may be carried out by a computer 399 that analyzes and/or controls the configuration of the FPGA.

100 represents the first step of the approach which examines the FPGA architecture to determine power-related information, e.g. the capacitance of the different components and routing lines. Many of the different microarchitecture features have listed capacitances in the specification sheet associated with the specific microarchitecture. For example, Xilinx produces a power manual which estimates the different capacitances and power consumptions of their various structures. The capacitance estimates can be further refined using laboratory experiments.

Table I illustrates the capacitance values that were used for the microarchitecture features for the Xilinx Virtex-II architecture.

TABLE I

| Resource | Capacitance (pF) |
| --- | --- |
| Embedded Multiplier | 1,196 |
| Block Select RAM | 880 |
| CLB | 26 |
| Long-line Route | 23 |
| Hex-line Route | 18 |
| Double-line Route | 13 |
| Direct-Connect Route | 5 |

Of course, other devices may have different capacitances and different tables indicating same.

The information in the table enables deriving a priority list of optimization for a given kernel. For example, note that an embedded multiplier has a capacitance of approximately 1200 pf, while the CLBs (Configurable Logic Blocks) have a capacitance of around 25 pf. The embedded multipliers are more efficient than the equivalent number of CLBs, but they consume the most power of any of the features in the FPGA. Hence, minimizing the number of multipliers may minimize the power consumed by the device.

110 illustrates the next step in the process which considers the DSP kernel itself, and specifically optimizes a specific convolution kernel based on its specific values. FIGS. 2a-2e show exemplary tap masks for blurring, sharpening, edge detection, derivative filtering, and template matching respectively. These examples show how there is typically symmetry within such a mask—that is, the tap values within the mask are typically reused. For example, the blurring masks use one single unique filter value. Sharpening and edge detection masks each use two unique values. Derivative filters use three unique values, and template filters can use any number of unique values depending on the template.

Figure 3A:
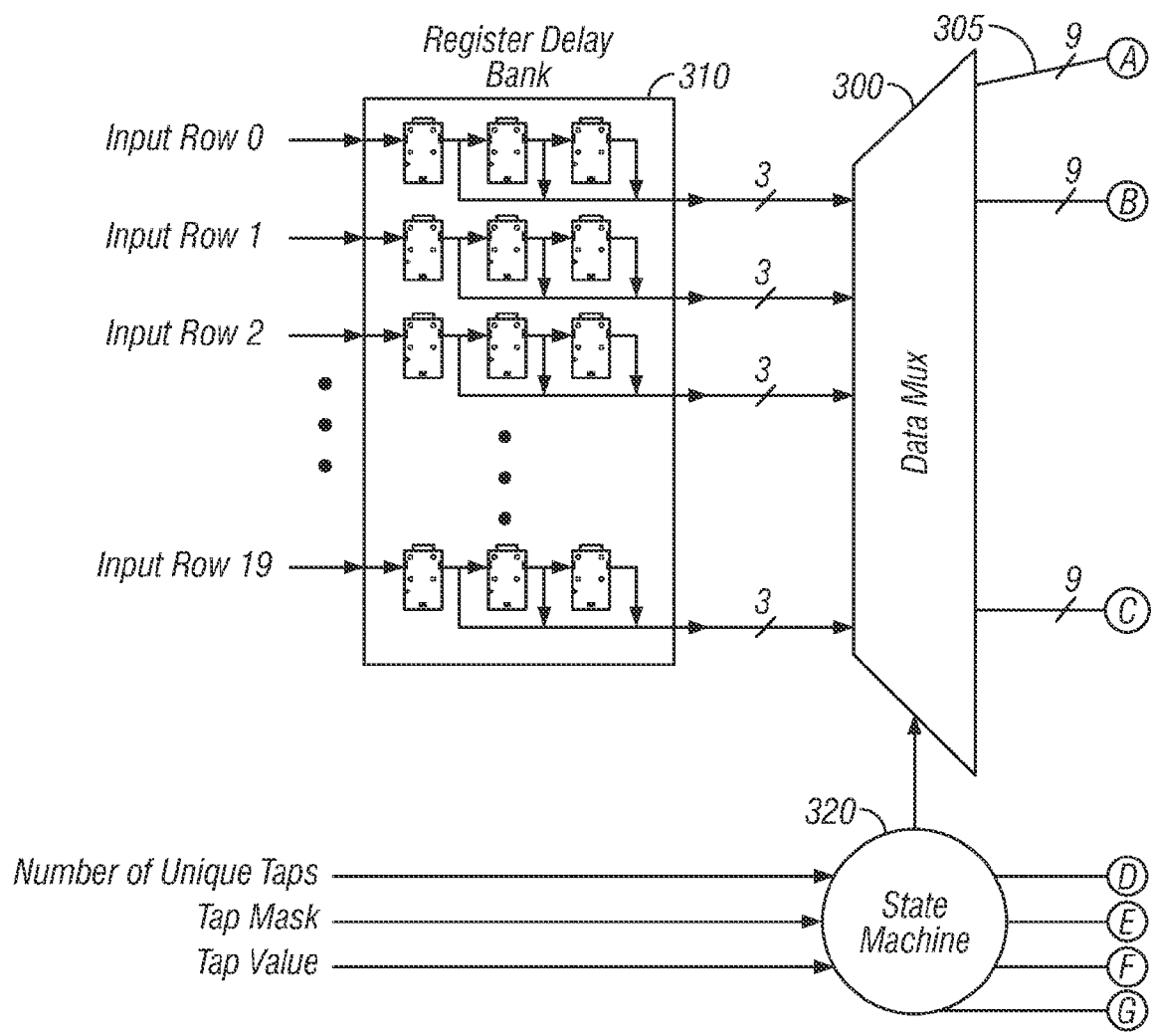
FIG. 3 shows a kernel block diagram.
Figure 3B:
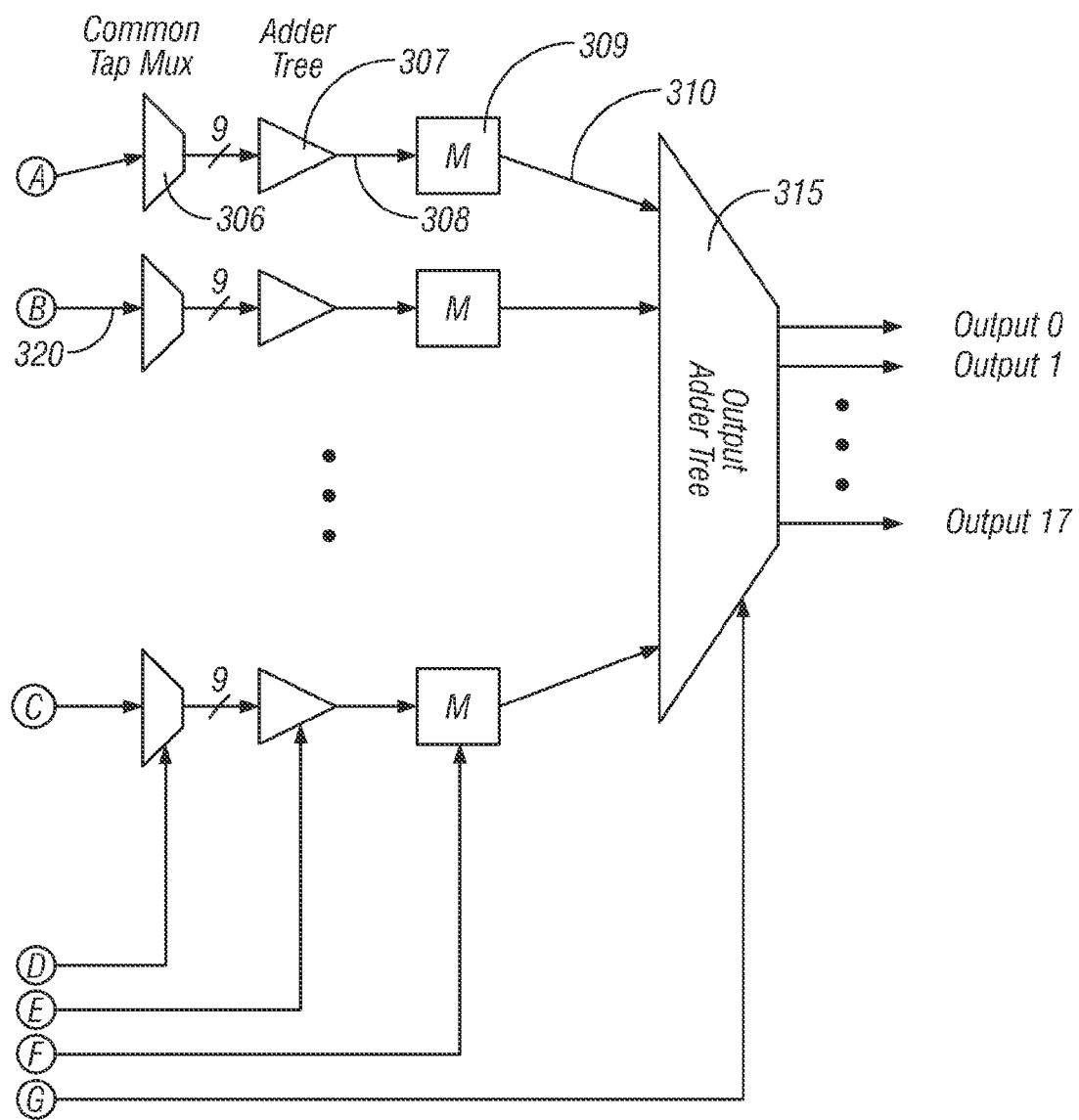

The tap symmetry is leveraged at 120 to reuse the multipliers, thereby minimizing the number of high capacitance multipliers per pixel. The multipliers are resource limited in FPGAs, because of their power consumption. However, adder trees are relatively cheap in terms of resources. The system uses extra adder trees to add before multiplying, thereby reducing the number of multiplications. FIG. 3 illustrates how the inputs are coupled to a register bank delay line 310. All of the different inputs are coupled to a data multiplexer 300. The multiplexer 300 switches the samples according to information obtained from a state machine 320 which represents the tap mask and tap values as well as the number of unique taps. This information is fed to the multiplexer 300 and used to sum all the samples from all of the input rows that will eventually be sent to common taps. Therefore, all inputs to all of the taps which are to be weighted by a common convolution value are output for example as 305 to the common tap multiplexer 306, and then summed by an adder tree 307.

The summed value 308 is multiplied by the multiplier 309. The output 310 from the multiplier is coupled to an adder tree 315 which receives the outputs from other comparable multipliers in other branches such as 320.

In this embodiment, each 3×3 neighborhood may be analyzed in this way, so the multiplexer 306 may switch and hence sum up to nine values. In this situation, where all values are summed by a common amount, all of the summing operations can be done on one of the branches. For example, where there are two unique weighting values, a second branch shown generically as 320, may be used for the second weighting, with the outputs being summed by the adder tree 315.

Therefore, this embodiment sums the values from all the matching taps using adder tree 307, before multiplying by the tap value in multiplier 309. In this way, a fixed number of multipliers can be used.

The number of pixels that can be processed in parallel depends on the number of unique taps in the filter mask. For taps that have minimal filter reuse, power efficiency is lost, e.g., 15% power efficiency is lost due to the extra overhead logic. However, in more common cases, there is more symmetry to exploit. The reduced number of multipliers can reduce the power consumption of the FPGA. Table 2 illustrates the power savings that can be obtained in this way.

TABLE 2

18 Multipliers Per Kernel

| Number of Unique Taps in 3 × 3 Conv. Mask | Number of Masks per Kernel | Speedup Over Traditional Convolution |
|---|---|---|
| 1 | 18 | 9× |
| 2 | 9 | 4.5× |
| 3 | 6 | 3× |
| 4 | 4 | 2× |
| 5 | 3 | 1.5× |
| 6 | 3 | 1.5× |
| 7-9 | 2 | 1× |

Another embodiment may leverage the existing tool suites to add power saving features to the conventional FPGA configuring tools. For example, this may use the above-described technique to reduce the power consumption in an FPGA.

The above has described using this system to reuse taps in a multiplying filter. However, other places where multiplication of various values by common weighting factors are done may also be streamlined in a similar way. For example, the I and Q data within an integrated circuit may be interleaved and parallelized, and a single multiplier may be used to weight/multiplex/demultiplex the combined data. As described above, the different taps in the filter may be merged. State machines may be operated in a burst mode, and other subsystems may be reused.

At the architecture level, the multipliers and adders may be reused, and different trade-offs between CLB's and multipliers and adders, as well as flip-flops versus shift registers may be investigated. Dynamic power estimates can be made by counting the signal transitions and simulating the power using the signal transition count. This may be used as dynamic visual feedback to a designer. The transition count may be collected during the simulation. For example, table 3 shows a counting of transitions

TABLE 3

| | | | | |
|---|---|---|---|---|
| x = 0 | y = 0 | out = 0 | transitions = 0 | total = 0 |
| x = 1 | y = 0 | out = 1 | transitions = 1 | total = 1 |
| x = 2 | y = 1 | out = 3 | transitions = 1 | total = 2 |
| x = 3 | y = 1 | out = 4 | transitions = 3 | total = 5 |
| x = 4 | y = 2 | out = 6 | transitions = 1 | total = 6 |
| x = 5 | y = 2 | out = 7 | transitions = 1 | total = 7 |
| x = 6 | y = 3 | out = 9 | transitions = 3 | total = 10 |
| x = 7 | y = 3 | out = 10 | transitions = 2 | total = 12 |
| x = 8 | y = 4 | out = 12 | transitions = 2 | total = 14 |
| x = 9 | y = 4 | out = 13 | transitions = 1 | total = 15 |
| x = 10 | y = 5 | out = 15 | transitions = 1 | total = 16 |
| x = 11 | y = 5 | out = 16 | transitions = 5 | total = 21 |
| x = 12 | y = 6 | out = 18 | transitions = 1 | total = 22 |
| x = 13 | y = 6 | out = 19 | transitiona = 1 | total = 23 |
| x = 14 | y = 7 | out = 21 | transitions = 2 | total = 25 |
| x = 15 | y = 7 | out = 22 | transitions = 2 | total = 27 |
| x = 16 | y = 8 | out = 24 | transitions = 3 | total = 30 |
| x = 17 | y = 8 | out = 25 | transitions = 1 | total = 31 |
| x = 18 | y = 9 | out = 27 | transitions = 1 | total = 32 |
| x = 19 | y = 9 | out = 28 | transitions = 3 | total = 35 |
| x = 20 | y = 10 | out = 30 | transitions = 1 | total = 36 |
| x = 21 | y = 10 | out = 31 | transitions = 1 | total = 37 |
| x = 22 | y = 11 | out = 33 | transitions = 5 | total = 42 |
| x = 23 | y = 11 | out = 34 | transitions = 2 | total = 44 |
| x = 24 | y = 12 | out = 36 | transitions = 2 | total = 46 |
| x = 25 | y = 12 | out = 37 | transitions = 1 | total = 47 |
| x = 26 | y = 13 | out = 39 | transitions = 1 | total = 48 |
| x = 27 | y = 13 | out = 40 | transitions = 4 | total = 52 |
| x = 28 | y = 14 | out = 42 | transitions = 1 | total = 53 |
| x = 29 | y = 14 | out = 43 | transitions = 1 | total = 54 |
| x = 30 | y = 15 | out = 45 | transitions = 2 | total = 56 |

32 Clock cycles 8 output bits
58 Transitions (22% transition rate)

The system can therefore analyze power consumption at logic simulation using pre-place and route, heuristic estimates, and RC data. This information can be used to visualize intuitive uses to aid the designer in finding more efficient circuits, and optimize.

Figure 4:
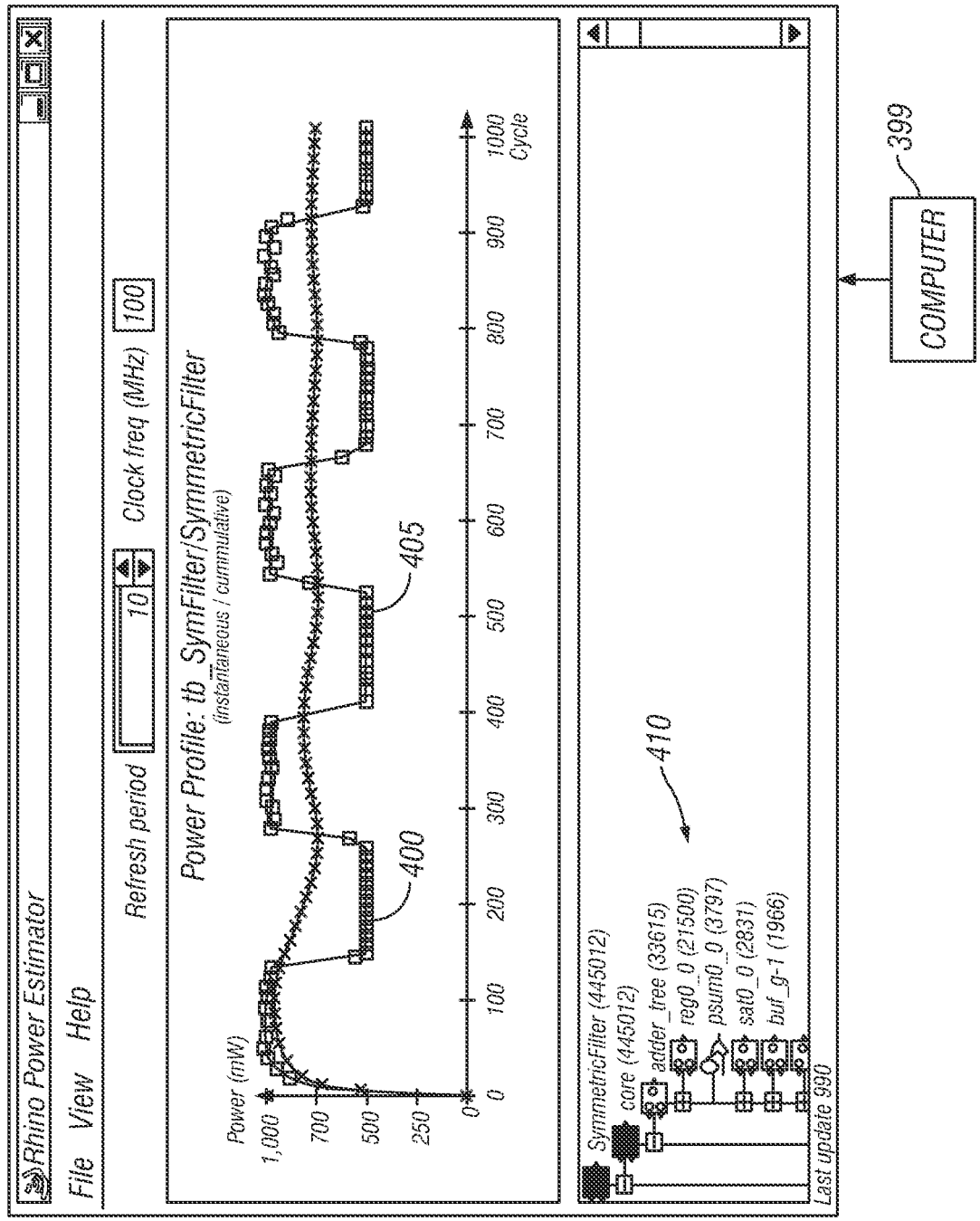
FIG. 4 shows a user interface for a power estimator.

FIG. 4 illustrates a computer 399 which can carry out various operations, including the flowchart of FIG. 1. FIG. 4 also shows an exemplary user interface screen that may be displayed on the computer 399. The information from the simulation determines instantaneous power 400, as well as cumulative power consumption over time 405. A sorted tree view 410 illustrates the worst offenders of power consumption. The designer can use this information in an attempt to minimize the power hungry portions.

Figure 5:
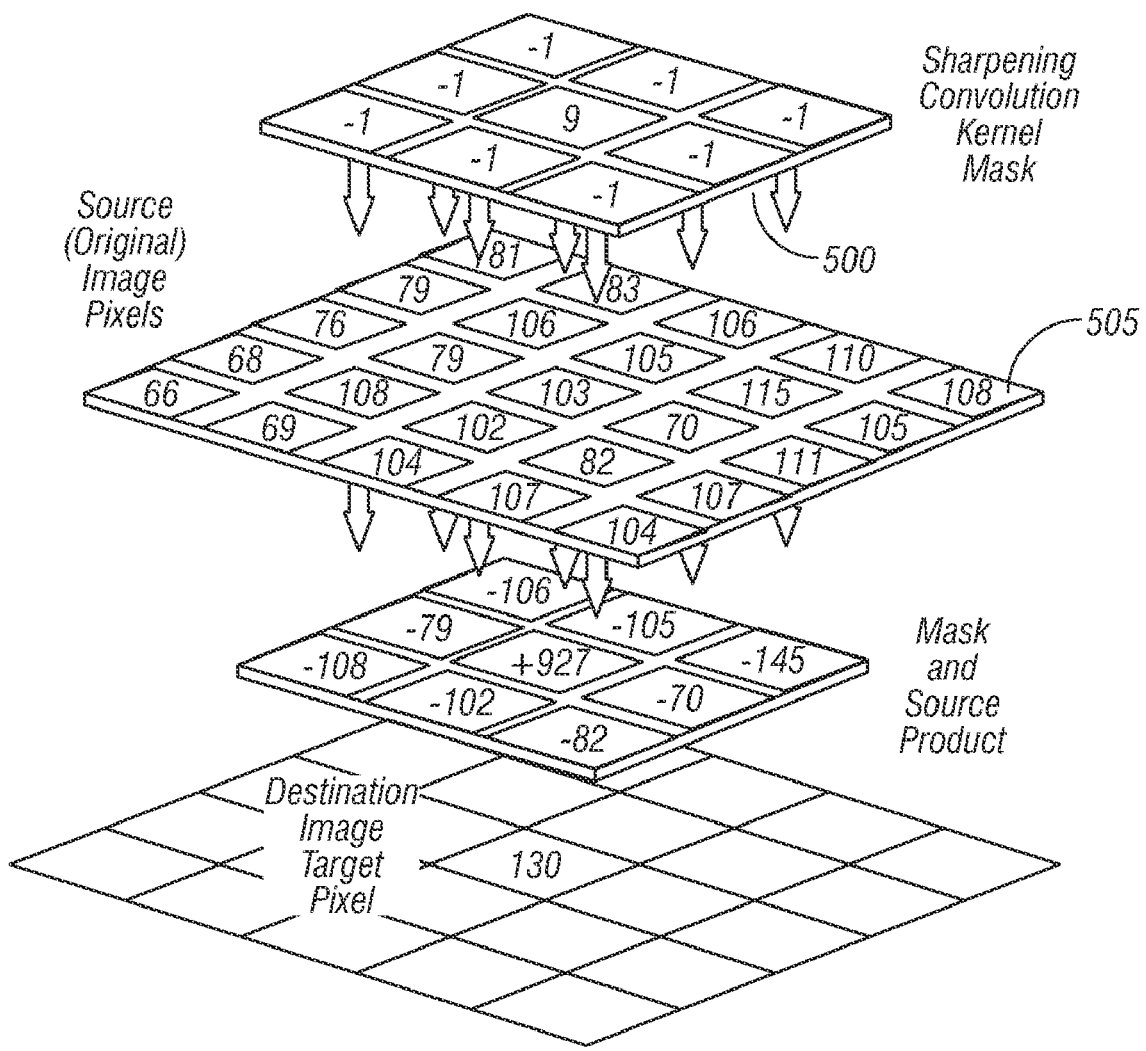
FIG. 5 shows an image convolution operation.

In operation, FIG. 5 illustrates a kernel mask formed of nine elements arranged as a 3×3 matrix. The kernel mask 500 is shown as being used on an original source image 505. Calculation of one output pixel, as illustrated in FIG. 5 has conventionally required nine multiplications and nine additions. This increases geometrically for more pixels, for example, for 256×256 pixels, 589,824 multiplications and additions are required.

Although only a few embodiments have been disclosed in detail above, other embodiments are possible and the inventor(s) intend these to be encompassed within this specification. The specification describes specific examples to accomplish a more general goal that may be accomplished in other way.

This disclosure is intended to be exemplary, and the claims are intended to cover any modification or alternative which might be predictable to a person having ordinary skill in the art. For example, different devices, that is, other than the ones specifically described herein, may be used in place of the Xilinx chip. In addition, other programmable devices, besides simply FPGAs, may be used.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A convolution system comprising:
   a state machine which:
      receives M×M image convolution tap values (where M>=3), an M×M tap mask which indicates which tap value positions utilize a common tap value, and a value indicating a number of unique filter tap values C (where 1<=C<=M×M), and
      based on a number of filter tap branches N implemented in the convolution system (where N>=M×M), sets multiplier coefficients, a number of adder tree levels to traverse, and
      sets a common tap multiplexer select value to send input pixel data values that are multiplied by the same image convolution tap value to the same filter tap branch, and
      calculates the available remaining filter tap branches and sets a data multiplexer select value to select multiple subsets of input pixels, and
      sets an output adder tree select value to accept N multiple parallel multiplied-output operations, and to produce multiple parallel image convolution outputs, floor(N/C);
   a data multiplexer which:
      receives an (M+N−1)×M two-dimensional matrix of values indicative of image pixels,
      based on the select value from the state machine, selects floor(N/C) subsets of M×M pixels, where each subset corresponds to a single 2-D image convolution and a single output pixel;
   a common tap multiplexer, which:
      receives a select value (D) from the state machine and an M×M pixel subset of values from the data multiplexer, and
      produces a further subset of 1 to M×M values which share a common filter tap value;
   an adder tree, which:
      receives the number of levels from the state machine and the output values of the common tap multiplexer, and
      adds said output values of said common tap multiplexer to form an added output; and
   a multiplier, which multiplies said added output by the tap value received from the state machine, to produce a multiplied output, wherein the common tap multiplexer, the adder, and the multiplier are included in a branch of the convolution system;
   an output adder tree, which:
      receives a select value from the state machine and multiplied output from the filter tap branches, and
      determines which C branch subsets constitute an output image pixel and adds each filter tap branch multiplier output subset together in parallel, producing floor(N/C) outputs.

2. The system as in claim 1, wherein said M×M two-dimensional image convolution tap values are configured for one of an image blurring, an image sharpening, an edge detection or a derivative.

3. The system as in claim 1, further comprising a delay register disposed upstream from and coupled with the data multiplexer, the delay register receiving (M+N−1) rows of pixel values, and delaying said pixel values M times to output, to the data multiplexer, the delayed pixel values substantially in parallel.

4. The system as in claim 1, wherein said data multiplexer, said N filter tap branches, each filter tap branch including said common tap multiplexer and said multiplier, said output tree adder, and said state machine are formed in a programmable gate array.

* * * * *